Oct. 19, 1937.  W. LAMBERT  2,096,522
BEVERAGE DISPENSING MACHINE
Filed May 12, 1936    5 Sheets-Sheet 3

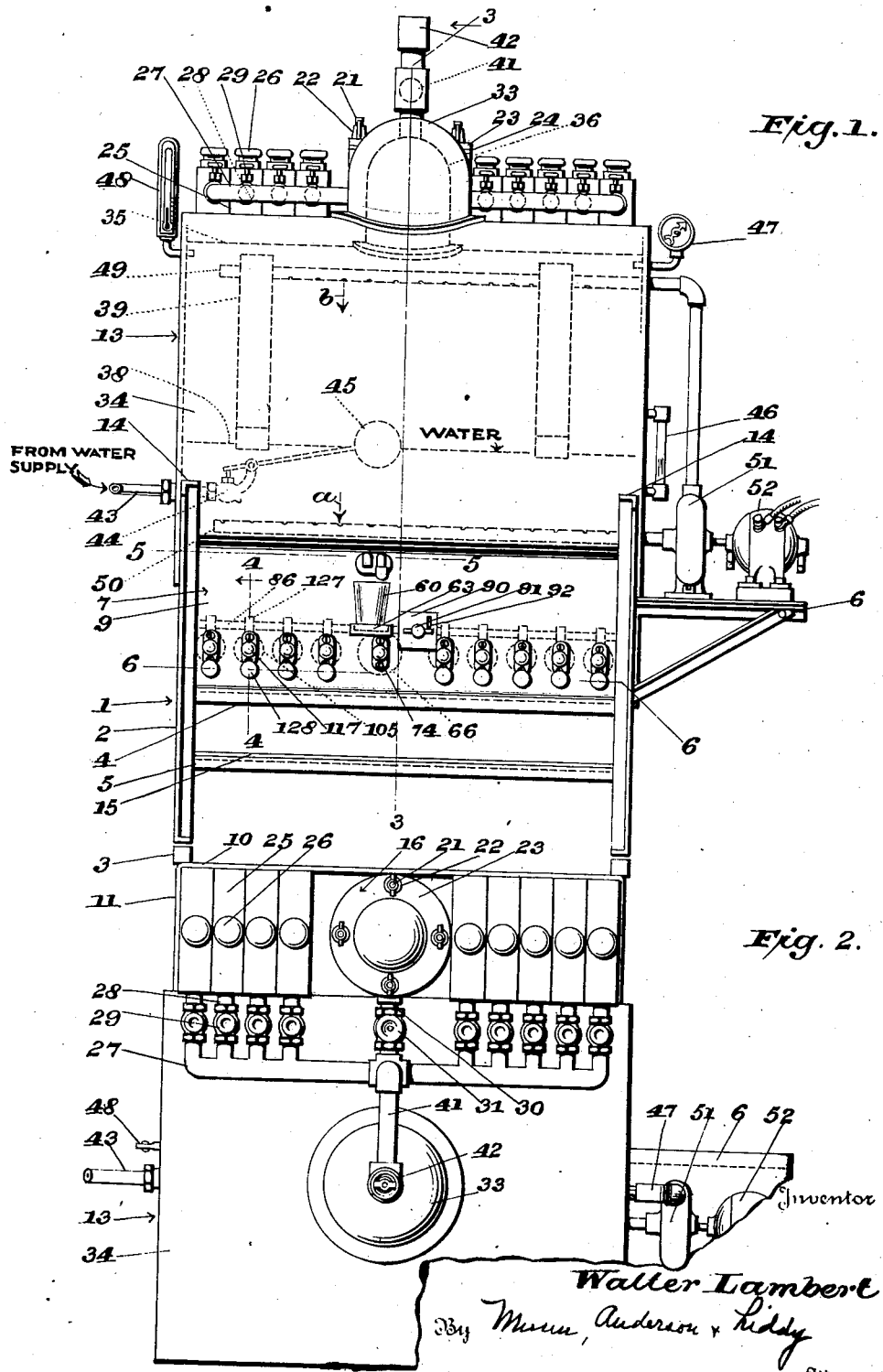

Inventor
Walter Lambert
By Munn, Anderson & Liddy
Attorney

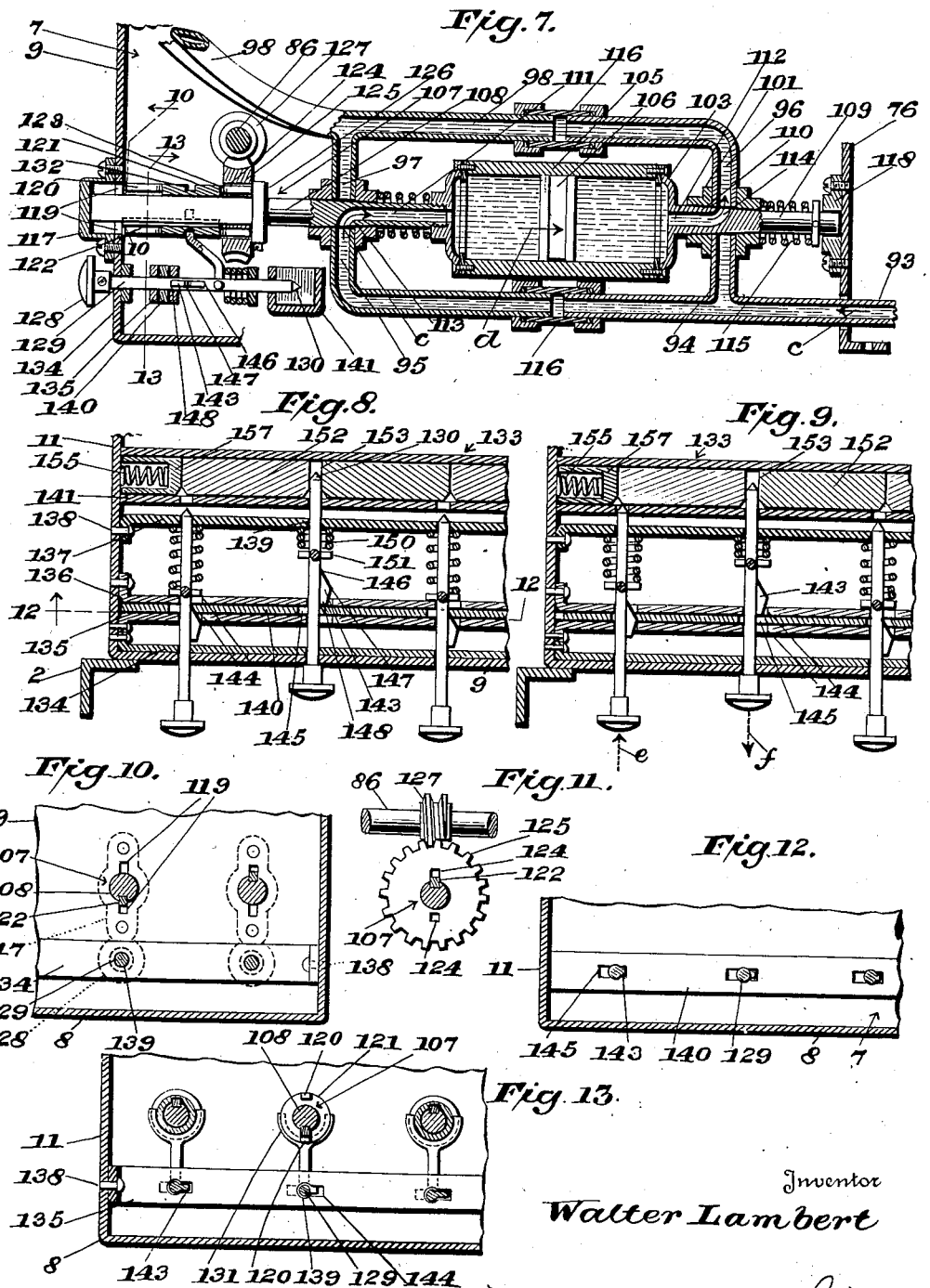

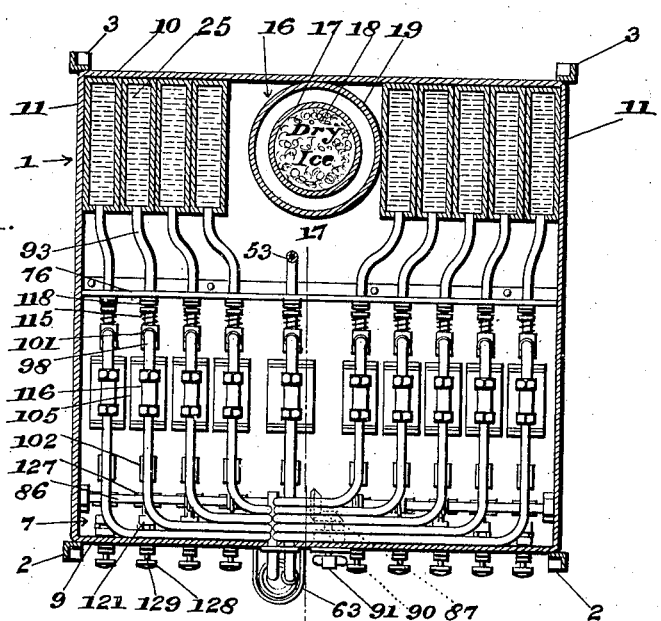
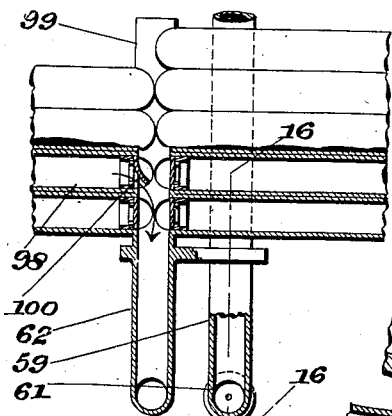
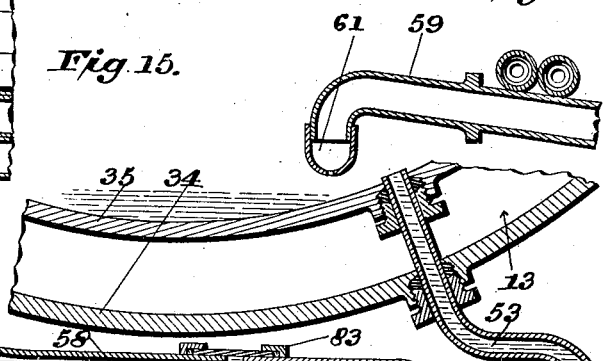
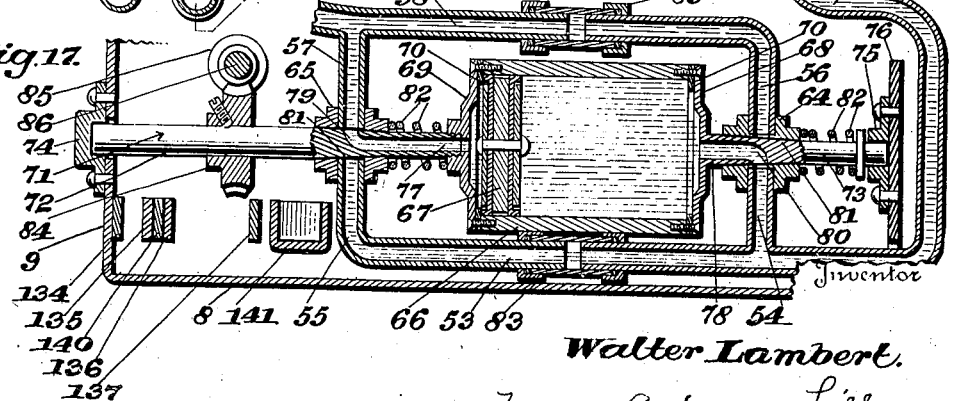

Patented Oct. 19, 1937

2,096,522

UNITED STATES PATENT OFFICE 2,096,522

BEVERAGE DISPENSING MACHINE

Walter Lambert, Yakima, Wash.

Application May 12, 1936, Serial No. 79,346

19 Claims. (Cl. 225—21)

This invention relates to improvements in beverage dispensing machines, and its objects are as follows:

First, to provide a machine by the use of which the purchaser can dispense to himself a cold, freshly mixed carbonated beverage of any flavor of syrup stored in the machine.

Second, to provide a machine of the foregoing character, which is governed in the extent of its operation by a coin control, said coin control limiting the amounts of dispensation of the beverage.

Third, to provide for the use of currently known dry ice (compressed carbon dioxide gas), and to put the expanded gas of this ice to the three-fold purpose of (1) refrigerating the water and fruit syrups, (2) carbonating the water and (3) producing the motive fluid for simultaneously expelling the carbonated water and selected fruit syrup from the respective pumps into the drinking glass wherein the mixture occurs.

Fourth, to use a motor-driven circulating contrivance, either a rotary pump or blower, to intermingle the carbonic acid gas and water to carbonate the water, said contrivance being operable at governed periods.

Fifth, to have the carbonated water pump constantly in readiness for operation but to make the operation of the fruit syrup pumps subject to selection, then to simultaneously operate both pumps, namely, the carbonated water and the selected fruit syrup pump, through the instrumentality of the coin control.

Sixth, to provide what is herein conveniently termed a lock-out device for insuring the operation of only one selecting button at a time, said device being so arranged that a selected button will stay pushed in and will not return to its normal position until released upon the pushing in of the next button.

Other objects and advantages will appear in the following specification, reference being had to the accompanying drawings, in which:

Figure 1 is a front elevation of the improved beverage dispensing machine.

Figure 2 is a plan view thereof, a portion being broken away.

Figure 7 is a section similar to Fig. 4, and illustrating the expelling action of the fruit syrup pump when the respective selected button is pushed in.

Figure 8 is a detail horizontal section taken on the line 8—8 of Fig. 4, illustrating the action of the lock-out device upon pushing the selected button in.

Figure 9 is a companion section showing how the lock-out device insures the release of the selected button when another is about to be pushed in.

Figure 10 is a detail cross section taken on the line 10—10 of Fig. 7, particularly showing the clutch notches in the front wall of the housing.

Figure 11 is a detail section on the line 11—11 of Fig. 4, showing the corresponding clutch notches in one of the worm gears.

Figure 12 is a section taken on the line 12—12 of Fig. 8.

Figure 13 is a section taken on the line 13—13 of Fig. 7.

Figure 14 is a horizontal section taken on the line 14—14 of Fig. 3.

Figure 15 is a detail sectional and elevational view especially showing how the syrup tubes are combined at the syrup discharge outlet.

Figure 16 is a detail cross section taken on the line 16—16 of Fig. 15, particularly showing the nozzle end of the carbonated water outlet.

Figure 17 is a cross section taken on the line 17—17 of Fig. 14, particularly illustrating the details of the carbonated water pump.

Figure 3:
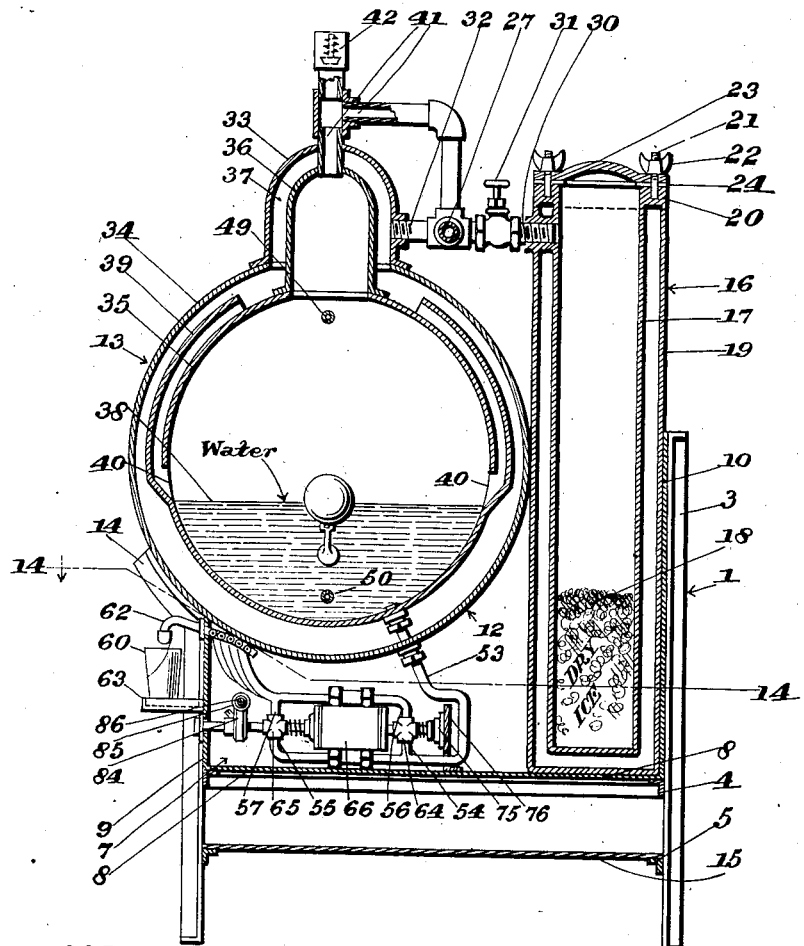
Figure 3 is a cross section taken on the line 3—3 of Fig. 1.

In carrying out the invention, provision is made of an appropriate support generally designated 1, which is herein shown as a framework built up of angle irons. This support is designed to carry all of the parts of the machine, and is subject to considerable modification as may be made necessary by changes in the proportions of the parts that it carries. For the purposes of this description the support consists of front legs 2, rear legs 3, an angle iron rectangle 4, cleats 5, and an appropriately braced shelf 6.

A housing 7 is so fitted in the framework that its bottom 8 rests on the rectangle 4 (Fig. 3), its front wall 9 extends upwardly inside of the front legs 2, and that its rear wall 10 extends upwardly inside of the rear legs 3. The housing also has side walls 11 (Fig. 14). These are cut out in the direction of a circle at 12 (Fig. 3) to provide a cradle for a tank generally designated 13. This tank is additionally supported by the upper curved terminals 14 of the front legs 2. A plate 15 (Fig. 3) is laid upon and fastened to the cleats 5 providing not only a brace, but a shelf as well.

In the approximate center of the machine, and at the back there is an upright dry ice container 16 (Figs. 3 and 14). This comprises an inner shell 17 which holds a quantity of dry ice 18. The outer shell 19 is spaced from the inner shell and the space has the air exhausted from it so as to reduce the exchange of heat to a minimum. The two shells are connected by a top annulus 20 (Fig. 3) from which a number of stud bolts 21 extend upwards. Winged nuts 22 are screwed downwardly on these bolts against the flange of a cover 23 so as to secure the latter against a gasket 24. This is a tight fit, and it prevents the leakage of gas from the container. The removal of the cover enables the replenishment of the ice supply.

Arranged along the rear wall 10 and on the inside of the housing 7 is a plurality of syrup containers 25. All of the containers 16, 25 stand on the bottom 8. Each container 25 will have a syrup of a different fruit flavor, and the number used will depend on the size of the machine. The instant showing is confined to nine containers, but in the following description only the container to which the lead line from the numeral 25 is run will be referred to in detail.

This container, as well as each of the others, has a screw cap 26 (Fig. 1) which when removed from the companion opening enables the replenishment of the syrup supply. A manifold 27 extends along the series of containers 25, there being a lateral 28 connecting each container with the manifold. The manifold conducts cold carbonic acid gas from the inner shell 17 (Fig. 3) to each of the syrup containers. Each lateral contains a valve 29 which is intended to be closed preparatory to removing the screw cap 26 so that there will not be an unwarranted loss of gas.

The manifold 27 (Fig. 3) has a pipe connection 30 to the inner shell 17. It is through this that the cold gas is derived. Said connection contains a valve 31 which is adapted to be closed upon removal of the cover 23 so that the cold gas already in the system will not escape. An extension 32 of the pipe connection 30 leads from the manifold 27 to the outer dome 33 on the outer shell 34 of the tank 13. An inner shell 35 with a corresponding but smaller dome 36 defines a space 37 into which the extension 32 discharges gas from the dry ice container 16.

This gas sets up considerable pressure in the system and, being cold, tends to travel downwardly in the space 37 (Fig. 3) so as to practically envelop the inner shell 35 which contains a volume of water 38. Eventually the gas in the space 37 escapes into one or more ducts 39 (Fig. 1) formed on the outside of the shell 35. The gas entering these ducts escapes at openings 40 (Fig. 3) into the interior of the shell 35, whence it reaches the dome 36 and enters a set of connected pipes 41 which eventually join the manifold 27 as shown.

The refrigerating system thus described begins at the inner shell 17, is traced to the manifold 27 and through its laterals to the series of syrup containers 25 and from the manifold to the inside of both shells 34, 35, not only cooling the fruit syrups but also the water. The set of piping 41 is topped with an appropriate check valve 42 which is preferably of the type that has an adjustment which enables it to automatically open at a desired pressure. Should the internal pressure become excessive this valve will open and prevent damage to the mechanical parts.

A pipe 43 (Fig. 1) leads from the water supply to the inner shell 35. A valve 44 on the inner end of the pipe is controlled by a float 45, opening and closing the valve when the water sinks and rises to its extreme levels. A gauge glass 46 indicates the water level. A pressure gauge 47 indicates the internal gas pressure. A thermometer 48 indicates the temperature.

A pair of perforated pipes 49, 50 run lengthwise of the inner shell 35, one being near the top and the other being submerged by the water 38. The pipe 49 is connected to the outlet of a centrifugal pump 51 which is fastened to the shelf 6 (Fig. 1) in common with a motor 52 which is coupled with the pump for driving the impeller. The pipe 50 is connected to the center inlet of the pump 51, and when the latter is operated a circulation of water is set up within the inner shell 35, serving to carbonate it.

This circulation consists of drawing the water into the pipe 50 (arrow a, Fig. 1) and expelling it in the form of a spray (arrow b). This spray is discharged through the atmosphere of carbonic acid gas, the intimate contact with the gas carbonating the water. The motor 52 is, in practice, connected in circuit with a contrivance which will cause it to operate at desired periods. This periodic operation of the motor will cause a periodic circulation within the inner shell so as to always have the water 38 in condition for completing a mixed drink.

Figures 5, 6:
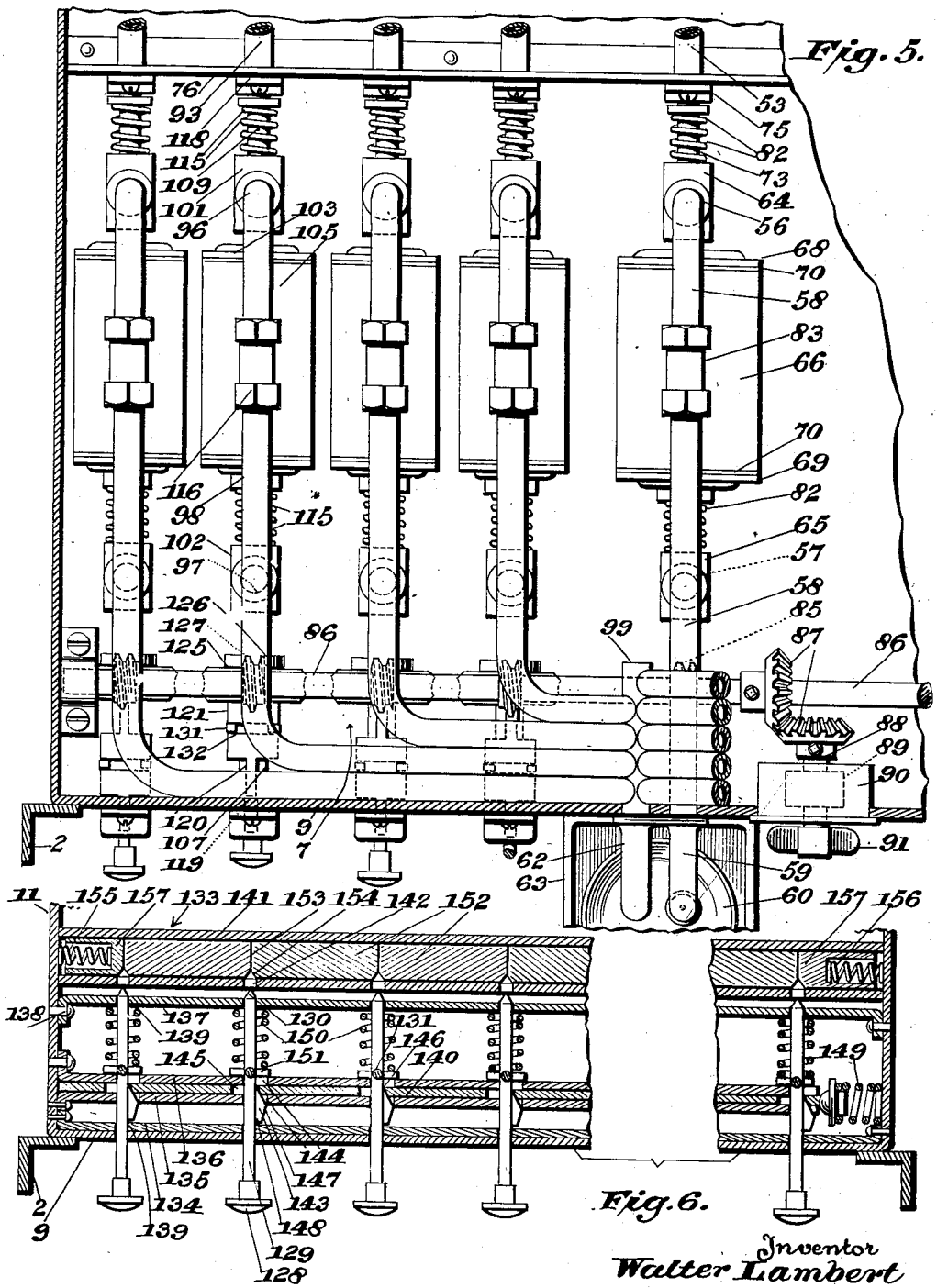
Figure 5 is a horizontal section taken on the line 5—5 of Figure 1.
Figure 6 is a horizontal section taken on the line 6—6 of Fig. 1, showing the lock-out device.

The manner in which a measured quantity of carbonated water is discharged for the foregoing purpose is as follows; a tube 53 (Fig. 17) leads from the inner shell 35 to a pair of laterals 54, 55, which have extensions 56, 57, which are connected to a discharge tube 58. This tube runs forwardly in the housing 7, extending through the front wall 9 (Fig. 5) where it terminates in a spout 59. This spout is curved downwardly so as to direct the water into the drinking glass 60, and it is capped with a nozzle 61 (Fig. 16) which increases the pressure of the discharging water because of the fine orifice that it has. This pressure discharge of the water is relied upon to produce the mixture of the fruit syrup in the glass. For this purpose the spout 59 is flanked by another and similar spout 62 (Fig. 5). This spout is for the discharge of the fruit syrup and it does not have an equivalent of the nozzle 61.

Both spouts are directed into the drinking glass 60, and when they discharge the carbonated water and syrup the mixture takes place in the glass. The latter is stood upon a tray 63 that extends forwardly from the housing. It is to be noted that both spouts 59, 62 stand on a slight upward pitch. The purpose of this is to cause both water and syrup to drain back after a discharge into the drinking glass so that there will not be an objectionable dripping in the tray.

The foregoing laterals 54, 55 (Fig. 17) and their extensions 56, 57 are connected by valve casings 64, 65. These valves confront the opposite ends of the cylinder 66 of a carbonated water pump which includes a floating piston 67. This pump, comprising the cylinder 66 and piston 67, is intended to deliver approximately five ounces of carbonated water to the drinking glass 60. Its opposite ends, now designated 68, 69, are secured to the ends of the cylinder against ring washers 70. These are sufficiently oversized to project into the cylinder and provide abutments for the piston 67 when the latter completes its movements in alternately opposite directions.

A shaft 71 consisting of the front and back parts 72, 73 is attached to the cylinder ends and is turnably supported in bearings 74, 75 at its extremities. The bearing 74 is attached to the front wall 9, while the bearing 75 is attached to a plate 76 upstanding from the bottom 8.

The front and back parts 72, 73 of the shaft 71 (Fig. 17) have oppositely extending passages 77, 78 which communicate with the pump cylinder 66 at their inner ends and terminate in oppositely directed ports 79, 80 at their outer ends. These ports lie in the zone of the laterals and their extensions, and when the shaft 71 is given a half turn these ports are reversed in position so that carbonated water (being under pressure) is discharged first from one end of the pump cylinder and then the other into the discharge tube 58, whence it flows to the drinking glass.

Tapered sections 81 on the shaft 71 match corresponding bores in the valves 64, 65. Springs 82 are so fitted in place as to keep the tapering surfaces in good contact. Any wear in these surfaces is compensated for by slip-joints 83 both in the tube 53 and the discharge tube 58. A worm gear 84 is secured to the shaft 71. This gear is in mesh with a worm pinion 85 on a drive shaft 86.

The foregoing carbonated water pump (Fig. 17) is in gear all of the time, but only one of the plurality of companion syrup pumps is in gear at a time, and the one which is in gear is subject to selection. The drive shaft 86 is permanently connected by a gear train 87 (Fig. 5) to the shaft 88 of a mechanism 89 in the coin control box 90. This mechanism is subject to only one operation by a full 360° turn of the finger-piece 91 when a coin is inserted in the slot 92 (Fig. 1). The details of the mechanism 89 are not essential here, it being sufficient to say that when the finger-piece 91 is given one full turn, the shaft 86 is given a corresponding full turn, but inasmuch as the pinion 85 (Fig. 17) is half the size of the gear 84 it follows that the shaft 71 receives only a half turn. It is this half turn that reverses the positions of the ports 79, 80 at every operation of the finger-piece 91.

Figure 4:
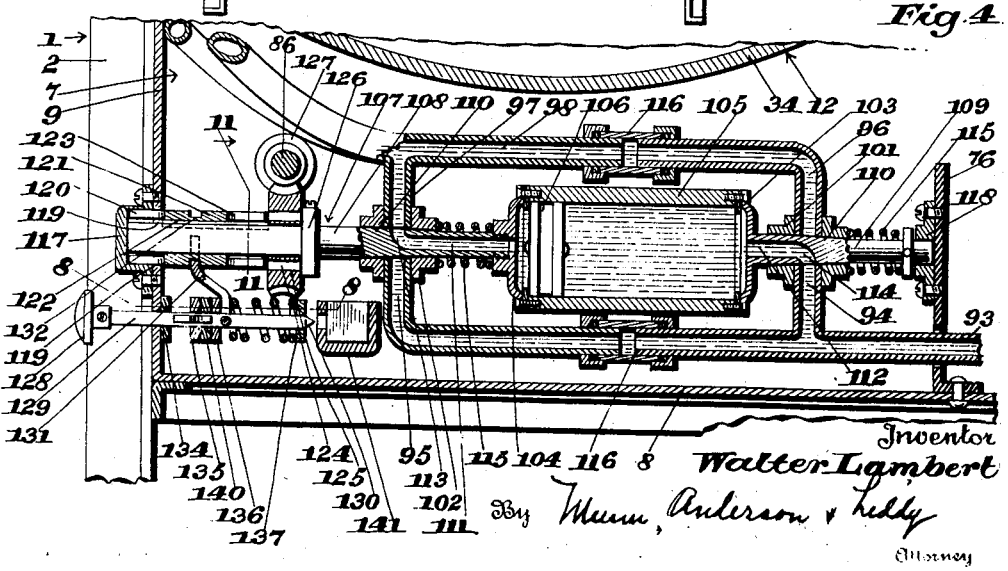
Figure 4 is a detail section taken on the line 4—4 of Fig. 1 and illustrating the structure associated with one of the fruit syrup pumps.

The manner in which the syrup is dispensed is as follows; the pump cylinder 105 is only one of a plurality of similar cylinders in the housing 7 (Fig. 14). The syrup pump cylinders are smaller, being intended to discharge one ounce of syrup. Since all of the syrup pumps are alike in construction, the present description is confined to the pump which goes with the previously selected syrup container 25. A tube 93 connects with the bottom of this container, and has a pair of laterals 94, 95 (Fig. 4). These laterals have extensions 96, 97 which connect with a discharge tube 98. This tube eventually communicates with the spout 62 (Fig. 5) but it is connected directly to a manifold 99 (Figs. 5 and 15) which is the common end of all similar syrup discharge tubes. The spout 62 is actually an extension of the manifold 99, and as the syrup is driven into the manifold under pressure, it opens a flap valve 100 (Fig. 15), the particular purpose of such corresponding valves at the ends of the other syrup discharge tubes being to avoid driving the syrup into a confronting tube rather than into the discharge spout.

The aforesaid laterals and their extensions (Fig. 4) are connected by valve casings 101—102. These confront the respective ends 103, 104 of the syrup pump cylinder 105. This cylinder contains a floating piston 106. The cylinder and its piston comprise the syrup pump. The cylinder ends are secured against oversize ring gaskets which provide abutments for the piston as in the instance of the carbonated water pump 66. A shaft 107, consisting of front and back parts 108, 109 has tapered sections 110 which match the tapered bores of the casings 101, 102 and complete these valves.

Passages 111, 112 in the front and back parts of the shaft 107 communicate with the opposite ends of the pump cylinder 105 and at their opposite ends have oppositely directed ports 113, 114, which work in the zone of the laterals and their extensions. Springs 115 maintain a tight fit in each of the two valves, and slip-joints 116 in the tubes 93, 98 compensate for wear.

Bearings 117, 118 (Fig. 4) support the opposite ends of the shaft 107. The front wall 109 constitutes the common mount for all of the front bearings, while the upstanding plate 76 provides the common mount for all back bearings. The front wall 9 is diametrically oppositely notched at 119 (Figs. 4, 7 and 10) to contain the correspondingly positioned lugs 120 (Fig. 13) of a clutch 121 when these project through into the bearing 117 in the forward and locking position of said clutch (Fig. 4). This clutch is slidable on a spline 122 set in the front part 108 of the shaft and when the clutch is in said forward position with its lugs 120 in the notches 119, the shaft 107 is locked against the half turn that is necessary to reverse the positions of the ports 113, 114 for the next syrup dispensation.

Lugs 123 on the clutch 121 corresponding to the lugs 120, but on the opposite ends of the clutch, are engageable with diametrically opposite openings 124 (Fig. 11) through the worm gear 125, which is loose on the shaft 107. There is a special feature connected with the clutch 121 that is enlarged upon later. The previously mentioned gear is held in position on the shaft by the end of the spline 122 on one side and a set collar 126 on the other side. It is in constant mesh with a worm pinion 127 on the drive shaft 86.

All of the worm pinions on the drive shaft 86 are alike, and all are fastened to the shaft so that when the coin control 90 is operated, following the insertion of the coin, all of the worm pinions are given a complete turn. All of the worm gears corresponding to 125 on the syrup pump shafts corresponding to 107 are alike, all being loose on the respective shafts. All of these gears are given a half turn when the coin control 90 is operated, but only the worm gear of the selected syrup pump will be effective in dispensing a charge of syrup, and the selection is accomplished in this way; a button 128 (Fig. 4) is adapted to be pressed in. This button is fixed on the outer end of a button shank 129, the inner end of which is sharpened to a point 130. The shank carries a fork 131 (Fig. 13) which occupies a circular groove 132 in the clutch 121. Upon pushing in of the button 128 the clutch 121 is moved from its locking engagement with the front wall 9 (Fig. 4) to an operating engagement with the worm gear 125 (Fig. 7), changing the shaft 107 from being locked against turning into readiness for a half turn when the coin control is operated.

The button 128 is directly associated with the lock-out device generally designated 133 (Fig. 6). This device occupies a transverse position, and the button shank 129, as well as all others like it, work crosswise of the lock-out device, pointing into the machine (Fig. 6). Bars 134, 135, 136 and 137 are disposed in parallelism to each other and are secured to the side walls 11, as at 138. The bars 134, 137 have holes 139 as does the front wall 9 thereby providing a guide for the button shank 129. The bar 134 is secured close to the front wall 9 and forms a brace. The bars 135, 136 comprise a guide pair. They have a locking bar 140 slidable between them. The last bar 137 is slightly spaced from a channel iron 141 which is appropriately secured at its ends to the side walls 11 so as to be in fixed relationship to the foregoing bars. One of its flanges has a hole 142 which the pointed end of the shank 129 is adapted to enter.

A wedge lug 143 (Fig. 6) on the side of the button shank 129 is movable in registering slots 144 in the guide bars 135, 136 and is movable through a slot 145 in the locking bar 140 (Figs. 6 and 12). The wedge lug has a point 146, a high place 147 and a heel 148. The lug slopes from the point to the high place and then recedes slightly toward the heel. The registering slots 144 are merely to provide for the passage of the wedge lug. When the lug moves inwardly by pressing the button 128 (Fig. 8) the locking bar 140 is displaced toward the right by the high place 147, and when the lug reaches its inward limit the locking bar 140 springs back to position behind the heel 148, locking the button and its carried parts to the pushed-in position.

A spring 149 (Fig. 6) permanently tends to move the locking bar 140 toward the left. It is against the tension of this spring that the locking bar is displaced toward the right, and when the wedge lug reaches the inward position the spring 149 causes the locking bar to snap behind the heel 148. A spring 150 on the button shank 129 serves to return the button 128 to its original position when the wedge lug 143 is released.

This spring bears against a cross pin 151 on the button shank. The release of the button shank 129 (Fig. 8) occurs when the button of another flavor selection is pushed in. Each of the series of buttons will be labeled with the flavor of syrup which its operation will dispense. It is impossible to push in two buttons at a time, this being prevented by a series of blocks 152 (Fig. 6) the division lines 153 of which register with the axial centers on the respective button shanks. The ends of these blocks are beveled adjacent to the division lines so as to form conical recesses 154 matching the shape of the point 130. When the button 128 is pushed in (Fig. 8) the point of its shank enters the recess 154 and parts the blocks against the tension of end springs 155, 156 (Fig. 6). These springs bear against the side walls 11 and are largely contained by end block sections 157, which complete the block series in the channel iron 141. The block sections 157 are originally spaced from the end walls but the spacing is such as to virtually disappear when the shank 129 is pushed in (Fig. 8) to part the block series.

The resulting displacement of the blocks, so that their division lines do not register with the axial centers of the remaining button shanks, causes said blocks to form an obstruction against any other shank being pushed all the way in. But the shank of another selection will, upon being pushed in, automatically release the shank 129 (the one that is now pushed in) and then in turn rearrange the blocks 152 so as to lock out the other button shanks.

At this point reference is again made to the clutch 121 for the special feature mentioned before. The clutch has a provision that will make it impossible to shift gears during a dispensing operation. Said provision consists of making the lugs 120, 123 (Figs. 4 and 7) substantially equal in length to the wedge lug 143, and to closely space the ends of the lugs 123 from the adjoining face of the gear 125 when disengaged from the openings 124.

This allows only an almost imperceptible movement of any dormant button shank should the operator attempt to push in the button of such a shank while a dispensing operation is in progress. The foregoing ends of the respective lugs 123 would contact the blank surface of the turning gear and block the attempt, in other words, prevent the gear shift.

Again, the ends of the lugs 120 are closely spaced from the front wall 9 when the clutch 121 is engaged with the gear 125 (Fig. 7), thus making it impossible to disengage the clutch until the dispensing operation is complete. The ends of the lugs 120 then confront the blank face of the wall, and it is not until they are brought into registration with the notches 119 at the end of a full half-turn that the clutch can be shifted forwardly or away from the gear 125.

The critical overall length of the clutches 121 (from end to end of the lugs 120, 123) and their closeness to the blank faces of the front wall 9 and gears 125 in the instances set out above, makes it impossible to either clutch in a new gear or clutch out the one in use during a dispensing operation. Thus the operation is assured of only one syrup pump 105 at a time.

The operation is readily understood. As the charge of dry ice 18 (Fig. 3) evaporates it fills the refrigerating system with cold carbonic acid gas, said system comprising the tank 13, the manifold 27 and the connected piping. The gas will build up considerable pressure within the system, and it is this pressure that drives a charge of carbonated water together with a charge of selected fruit syrup into the drinking glass 60 every time the coin control 90 is properly operated. All syrup tubes corresponding to 93 connect with the bottoms of the syrup containers. There is therefore some gravity flow, but the gas pressure is depended upon to actually drive the syrup into the drinking glass. This is so because gas pressure is imposed upon the syrup in each container, just as gas pressure is imposed upon the water 38 in the tank 13.

The second button 128 from the left (Fig. 1) is the one herein selected for illustration. This button can be pushed all the way in only after a previously selected button has been permitted to return to its original position. When this button 128 reaches the inward limit, the locking bar 140 snaps behind the wedge lug 143 and holds the button in the inward position (Fig. 8).

This act moves the clutch 121 from its locked position against the front wall 9 (Fig. 4) into the position of engagement with the worm gear 125. The respective pump 105 is now in gear with the drive shaft 86 whereas it was not so before, thus matching the condition of the carbonated water pump 66 (Fig. 17) which is always in gear with the drive shaft 86. The latter is not capable of being turned until a coin is inserted in the slot 92 (Fig. 1) and the mechanism 89 thereby rendered active to couple the gear train 87 (Fig. 5) to the finger-piece 91.

The latter is now given a full turn. This full turn is imparted to the drive shaft 86, but because of the reduction between the pinion 127 and worm gear 125, the shaft 107 (Fig. 4) makes only a half turn, and desirably so in order to reverse the positions of the ports 113, 114 (Figs. 4 and 7), the pump cylinder 105 also turning.

The piston 106 (now at the left of cylinder 105) as the result of an earlier operation, is now in the path of pressure fluid flowing in the tube 93 in the direction of arrows c (Fig. 7) and in moving in the direction of arrow d by force of the pressure fluid, drives out the charge of syrup at the right of the piston, into the discharge tube 98, manifold 99 and syrup spout 62.

Simultaneously with this syrup dispensing operation the pump 66 (Fig. 17) dispenses a charge of carbonated water. The ports 79, 80 are reversed in position simultaneously with the reversal of the ports 113, 114, the pump cylinder 66 turning as these ports are reversed, and a charge of water acting against the left end of the piston 67 drives out the charge at the right into the discharge tube 58 and so on into the drinking glass where it mixes with the fruit syrup. The water and syrup pistons 67, 106 are thus driven back and forth in the respective cylinders in alternation in their dispensing operations. The charges of water and syrup which now enter the pump cylinders under pressure to actuate the pistons lie dormant until a succeeding dispensing operation when said charges are driven out under pressure of water and syrup in the opposite direction.

Assume that after any prior dispensing operation the first button at the left of the series (Fig. 1) is the next selection. When this button is pushed in far enough (arrow e, Fig. 9) to bring its point 130 into contact with the nearest block 152, the wedge lug on the shank of said button will have displaced the locking bar 140 sufficiently far toward the right to clear the path for the lug 143 of the previously selected button 128 (Fig. 9) which, up to this time, has been regarded as locked in the inward position (Fig. 8).

A path having been cleared for the lug of the second button, it is plain that the latter can move outwardly in the direction of arrow f (Fig. 9) and by the time this lug has reassumed approximately its original position, the button 128 then being approximately at its original position also, the blocks 152 will close again under the influence of the springs 155, 156, their division lines 153 being restored to the axial positions whence partition can occur again when the left end button is pushed the remaining way in. It is repeated that these acts cannot occur while a dispensing operation is in progress.

At such a time all gears 125 are turning, only one, however, being effective to dispense syrup, and since the openings 124 will then be traveling the circle it follows that the ends of any pair of lugs 123 would only strike a blank face if a pushing in attempt were made.

From this description of the lock-out device and the clutches (Figs. 6, 8 and 9) it should be clear that the pushing in of any button will unlock any syrup dispensing unit already in gear before said button can be locked in the inward position in substitution of the one which it displaced, and that there cannot be any gear shifting after a selected button has once started a dispensing operation. This, as already brought out, insures the dispensation of only one charge of fruit syrup by any single paid vending operation. Reverting to the action of the centrifugal pump 51 (Fig. 1), it is considered optional whether this shall be a water pump or an air pump. The top pipe 49 can be introduced into the central intake of the pump, and the pipe 50 connected with its outlet. The action then would be to cause the carbonated air to bubble up through the water rather than to spray the water through the air. In either case the result would be the same.

I claim:

1. A beverage dispensing machine comprising a water tank, a syrup container, water and syrup pumps having connections to the respective tank and to the container, a fluid pressure source coupled with the tank and container to put the water and syrup under pressure, and means for utilizing the fluid pressure against the water and syrup columns for operating both pumps simultaneously to dispense charges of water and syrup previously entrapped in said pumps into a drinking glass.

2. A beverage dispensing machine comprising a water tank, a syrup container, a dry ice container and piping for leading the gas therefrom to the respective tank and syrup container, to cool the water and syrup and put them under pressure, a water pump connected with the tank, a syrup pump connected with the syrup container, said pumps having discharge tubes, and means for utilizing said pressure to simultaneously operate both pumps and drive out previously contained charges of water and syrup into the discharge tubes for dispensation in a glass.

3. A beverage dispensing machine comprising a water tank, a syrup container, a dry ice container having connecting piping both to the tank and syrup container, the dry ice vapor refrigerating the water and syrup and placing both under pressure, a pair of pumps, each including a floating piston, piping connecting the opposite ends of one pump to the water tank, similar piping connecting the opposite ends of the other pump to the syrup container, discharge pipes for the two pumps, both discharge pipes having connections to the opposite ends of the respective cylinders, valve means for each pump for reversing the application of pressure alternately to the opposite ends of the pump cylinders, thereby moving the floating pistons to drive out previously contained charges of water and syrup into the respective discharge pipes, and coin controlled means by which to actuate the valve means.

4. In a beverage dispensing machine, a water tank, a plurality of syrup containers, a manifold common to all of the containers and having laterals leading to each container, a dry ice container, piping connecting the dry ice container with the tank and manifold to conduct the dry ice vapor for refrigerating water in the tank and syrup in the syrup containers and to place both under pressure, and valves in each of the laterals and in the piping enabling closing off a desired syrup container and closing off the ice container preparatory to replenishing the supplies of syrup and dry ice.

5. In a beverage dispensing machine, a water tank, a dry ice container having piping connected to the tank to conduct dry ice vapor to said tank for refrigerating water contained thereby and to place it under pressure, and means for periodically causing an intermingling of the vapor and water to carbonate the water.

6. In a beverage dispensing machine, a water tank, a dry ice container having piping connected to the tank for conducting carbonic acid gas given off by dry ice in said container to the tank for refrigerating water therein and to place it under pressure, a pair of perforated pipes in the tank, one being situated in the atmosphere of gas and the other submerged by the water, a centrifugal pump which has an outlet and an inlet to which the respective pipes are connected, and a motor for driving the pump to cause a circulation of the water through said pipes and through the gas for an impregnation of the water with gas.

7. A beverage dispensing machine comprising a water tank, a plurality of syrup containers, a dry ice container and piping leading therefrom to the respective tank and syrup containers for the conduction of carbonic acid gas thereto to refrigerate the water and syrup and place them under pressure, a water pump connected with the tank, syrup pumps connected with the respective syrup containers, all of said pumps having discharge tubes, a coin control and valve means which is actuated when the coin control is operated to utilize the gas pressure for driving out charges of water and syrup, and means which is operated by manual selection to make only one of the syrup pumps operative so that the selected pump operates simultaneously with the water pump.

8. In a beverage dispensing machine, a water pump, at least two syrup pumps, a floating piston in each pump, sources of water and syrup supply to fill the respective pumps with water and syrup, valve means and discharge tubing for each pump, operating means for each valve means, the operating means of the water pump being permanently in gear with the respective valve means, selecting means to render one operating means of the syrup pumps effective to actuate that respective valve means, and means which is worked by hand to actuate the operating means causing a simultaneous operation of the valve means of the water pump and the selected syrup pump for a movement of their pistons to drive out charges of water and syrup.

9. In a beverage dispensing machine, a water pump, at least two syrup pumps, each pump having a floating piston, reversible valves at the ends of the pumps, tubing connecting the water pump valves to a source of water under pressure, tubing connecting the valves at the ends of the syrup pumps to sources of syrup under pressure, the respective valves also having water and syrup discharging tubing, means which when worked reverses the positions of the water pump valves and of one of the syrup pump valves, thereby admitting water and syrup under pressure to move the pistons and drive out charges of water and syrup into the discharge tubings, and selecting means by which only one of the syrup pumps is rendered active to operate simultaneously with the water pump.

10. A beverage dispensing machine comprising a tank containing water under pressure, a plurality of containers each having syrup under pressure, a single water pump and a plurality of syrup pumps having connections to the respective tank and containers, means by which to operate the water pump simultaneously with one of the syrup pumps, selecting means by which only the one syrup pump can thus be operated, and a lock-out device for insuring the operativeness of only the one syrup pump, said lock-out device rendering said one syrup pump inoperative before another can be selected for operation.

11. In a beverage dispensing machine, a liquid pump consisting of a closed ended cylinder and a floating piston, a turnable shaft connected to the ends and having passages communicating with the cylinder, and terminating in oppositely directed ports, valve casings through which the shaft goes adjacent to the cylinder ends, said ports being within the confines of the casings, a tubing communicating with a source of pressure liquid and having laterals entering one side of the casings, a discharge tubing having laterals entering the opposite sides of the casings, and means for turning the shaft to reverse the positions of the ports, thereby admitting pressure liquid first to one and then the other end of the cylinder to actuate the piston for driving previously admitted charges of liquid into the exhaust tubing.

12. In a beverage dispensing machine, a liquid pump including a floating piston, a tubing communicating with a source of pressure liquid having laterals at the respective ends of the pump, a discharge tubing having matching laterals at the opposite ends of the pump, valve casings in which the laterals are connected, said casings having tapering bores, a shaft carrying the pump, having tapered sections occupying said bores, said sections having oppositely directed ports merging into passages in the shaft which communicate with the opposite ends of the pump, resilient means between the pump ends and valve casings to keep the tapered sections seated, and slip-joints in the tubings between the laterals to compensate for wear in the valve casings.

13. In a beverage dispensing machine, a single water pump, at least two syrup pumps, each pump consisting of a cylinder and a floating piston, a turnably supported shaft for each pump consisting of front and back parts connected with the respective ends of each cylinder, each shaft having passages communicating with the opposite ends of the cylinders and having oppositely directed ports, valve casings at the ends of the pump cylinders, said casings having the ports confined therein and having pairs of laterals which connect with inlet and discharge tubings for the admission of pressure water and syrup and the discharge of water and syrup, a common drive shaft, gearing permanently in gear between the drive shaft and water pump shaft, similar gearing loosely connecting the drive shaft to the syrup pump shafts, selectable clutch means for clutching in the gearing at one of the syrup pumps, and means for then working the drive shaft thus to simultaneously operate the water pump and the selected syrup pump.

14. In a beverage dispensing machine, a liquid pump including a closed ended cylinder and a floating piston, a shaft connected to the ends of the cylinder, valve means combined with the shaft, and a source of pressure liquid connected with the valve means, a gear loose on the shaft, an element confronting the gear and fixed relatively to the shaft, a clutch splined on the shaft being engageable with said element to prevent turning of the shaft, means to shift the clutch into engagement with the gear, and means to then turn the gear and so turn the shaft for a reversal of the valves to admit pressure liquid to one end of the cylinder for moving the piston to drive out a previously admitted charge of liquid.

15. In a beverage dispensing machine, a plurality of liquid pumps, one for water, the others for syrup, a pair of valves for each pump, said valves being connected respectively with a source of pressure water and with sources of pressure syrup, the respective valves also being connected with discharge tubings, shafts for the various pumps with which the pairs of valves are combined so that when a shaft is turned the respective valves are reversed in position, driving means permanently coupled with the water pump shaft and loosely coupled with the syrup pump shafts, push button operated clutch means for each syrup pump being selectable to clutch in the coupling between the drive means and the shaft of the selected pump, and a lock-out device with which the push buttons are combined, said lock-out device including means holding a selected button when pushed in and also causing the release of said button as another button is pushed in, but before said button can be pushed in far enough to clutch in the respective coupling means.

16. In a beverage dispensing machine, a plurality of syrup pumps, valve means combined with each pump which, upon operation, releases a charge of syrup, drive means which, upon being worked, actuates the valve means, an equal plurality of push buttons enabling a selection of the valve means to be worked, each push button having means for coupling the operating means to the respective valve means, a shank for each push button, a wedge lug on each shank, fixed guide bars with registering slots in which the lugs can move, and a locking bar guided by said pair of bars having a spring placing it under tension, the pushing in of one button causing the wedge lug to displace the locking bar, and to hold the button by catching the lug, and a spring on each button shank causing the return of the pushed in button when another button is pushed in and its wedge lug again displaces the locking bar to release the previously held lug.

17. In a beverage dispensing machine, a plurality of selectable push buttons, each having a pointed shank, guide means by which the shanks are movably carried, a channel iron confronting the guide means and having holes in line with the points of the shanks, a series of blocks contained by the channel iron, the division lines of the blocks being adapted to register with the axial centers of the shanks to enable parting the blocks by the point of one shank when its button is pushed in, and block sections at the ends of the block series, each having springs engaging adjacent abutments, the amount of parting movement of the blocks being approximately equal to the diameter of a shank.

18. In a beverage dispensing machine, at least two liquid pumps each including a cylinder and a floating piston, shafts connected to the ends of the respective cylinders, valve means combined with each shaft, and a source of pressure liquid connected with the respective valve means so that when a selected valve means is turned there will be the expulsion of a charge of liquid from the respective cylinder by the resulting motion of its piston, a driven gear loose on each shaft, a clutch on each shaft, one of the clutches being selected to connect the respective gear to the shaft, and means preventing the shifting of the other clutch during a dispensing operation from the selected cylinder, said means comprising the close spacing of lugs on the clutch with respect to the solid side of the gearing, each gear having openings to admit the respective lugs according to selection.

19. In a beverage dispensing machine, a housing which includes a front wall, a liquid dispensing device in the housing which consists of a cylinder having a floating piston, a shaft which consists of portions connected to the ends of the cylinder, one of said portions being journaled on the front wall which front wall has at least one opening adjacent to the shaft portion, valve means combined with the shaft, a source of pressure liquid connected with the valve means and causing the piston to move to discharge a volume of liquid when the shaft is turned to so position the valve means as to enable passage of pressure liquid, a driven gear loose on the shaft, said gear having an opening, and a clutch on the shaft portion by which the gear is coupled to said portion, said clutch having lugs on its opposite ends capable of occupying the opening either in the wall or the gear, the overall length of the clutch between the ends of the lugs being slightly less than the distance between the confronting faces of the wall and gear.

WALTER LAMBERT.